United States Patent [19]

Ojima et al.

[11] Patent Number: 5,382,489

[45] Date of Patent: Jan. 17, 1995

[54] ELECTROPHOTOGRAPHIC PHOTORECEPTOR WITH POLYCARBONATE RESIN MIXTURE

[75] Inventors: Fumio Ojima; Kiyokazu Mashimo; Toru Ishii; Tomoo Kobayashi; Taketoshi Hoshizaki, all of Minami Ashigara, Japan

[73] Assignee: Fuji Xerox Co., Ltd., Tokyo, Japan

[21] Appl. No.: 99,541

[22] Filed: Jul. 30, 1993

[30] Foreign Application Priority Data

Aug. 6, 1992 [JP] Japan .................................. 4-229388
Aug. 6, 1992 [JP] Japan .................................. 4-229389

[51] Int. Cl.6 ................................................ G03G 5/04
[52] U.S. Cl. ........................................ 430/96; 430/58
[58] Field of Search .................................... 430/58, 96

[56] References Cited

U.S. PATENT DOCUMENTS

| 4,851,314 | 7/1989 | Yoshihara | 430/58 X |
|---|---|---|---|
| 4,956,256 | 9/1990 | Ohtsuka et al. | 430/96 |
| 5,141,832 | 8/1992 | Takegawa et al. | 430/96 |
| 5,254,423 | 10/1993 | Mayama et al. | 430/58 |

FOREIGN PATENT DOCUMENTS

| 60-172044 | 9/1985 | Japan . |
|---|---|---|
| 62-247374 | 10/1987 | Japan . |
| 63-148263 | 6/1988 | Japan . |
| 2-254459 | 10/1990 | Japan . |
| 2-254464 | 10/1990 | Japan . |
| 276761 | 10/1992 | Japan .................................. 430/96 |

*Primary Examiner*—Roland Martin
*Attorney, Agent, or Firm*—Oliff & Berridge

[57] ABSTRACT

An electrophotographic photoreceptor comprising a conductive substrate having formed thereon a photosensitive layer containing, as binder resins, (A) a polycarbonate resin comprising a recurring unit represented by formula (I):

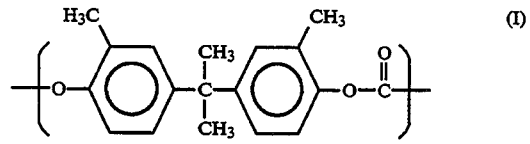

and (B) a polycarbonate resin comprising a recurring unit represented by formula (II) or (III):

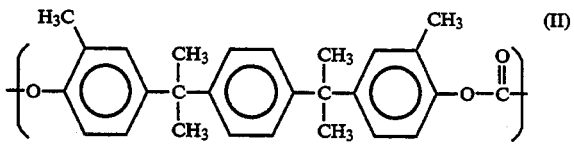

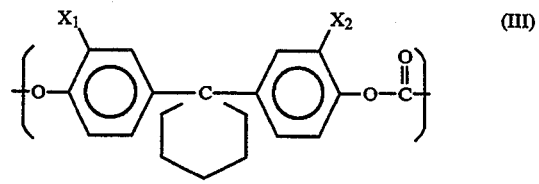

wherein $X_1$ and $X_2$ each represent a hydrogen atom or an alkyl group, or (B') a copolycarbonate resin comprising a recurring unit represented by formula (II) and a recurring unit represented by formula (IV):

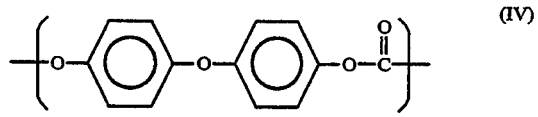

said polycarbonate resin (B) or copolycarbonate resin (B') having a lower molecular weight than that of said polycarbonate resin (A). The photoreceptor had high film strength against abrasion and causes no toner filming or adhesion of any other foreign substances and is therefore excellent in electric characteristics and image characteristics.

6 Claims, No Drawings

ELECTROPHOTOGRAPHIC PHOTORECEPTOR WITH POLYCARBONATE RESIN MIXTURE

FIELD OF THE INVENTION

This invention relates to an electrophotographic photoreceptor and more particularly to an electrophotographic photoreceptor excellent in durability and electrophotographic characteristics.

BACKGROUND OF THE INVENTION

Electrophotography has been broadening its application in the field of copying machines, laser beam printers, etc. because of the advantages of high speed and high image quality.

Photoreceptors conventionally widespread in electrophotography are those comprising inorganic photoconductive materials, such as selenium, selenium-tellurium alloys, selenium-arsenic alloys, and cadmium sulfide.

Organic photoreceptors comprising organic photoconductive materials have also been studied with attention being paid on their merits over inorganic photoreceptors, such as cheapness, productivity, and ease of disposal. In particular, organic photoreceptors of separate function type having a laminate structure composed of a charge generating layer which functions to generate charge on exposure to light and a charge transporting layer which functions to transport the generated charge are excellent in electrophotographic characteristics, such as sensitivity, charging properties, and stability of these properties on repeated use. Various proposals on this type of photoreceptors have been made to date, and some of them have been put to practical use.

While organic laminate type photoreceptors with sufficient performance in terms of the above-mentioned electrophotographic characteristics have been developed, there still remains an unsolved problem of durability against outer force in nature of the organic materials used. That is, being made of an organic material, a photosensitive layer easily undergoes wear or scratches on contact with a toner, a developer, a transfer medium (e.g., paper), a cleaning member, and the like and tends to cause image defects due to a toner filming phenomenon, adhesion of foreign substances, etc. Besides, low-resistant substances, such as corona discharge-induced ozone and nitrogen oxides, and paper dust from copying paper are liable to adhere and be deposited on the surface of the photoreceptor, which leads to image running under a high humidity condition. The working life of an organic photoreceptor has been considerably limited by these phenomena.

On the other hand, with the recent advancement in color image formation and high-speed recording with copying machines and color printers, the process involved has been getting more complicated, and the stress imposed on a photoreceptor has been increasing. From this viewpoint, the demand for improved durability of an electrophotographic photoreceptor has been increasing.

A number of measures have ever been proposed to improve durability of an electrophotographic photoreceptor. For example, polymethyl methacrylate resins, polyester resins, polycarbonate resins, etc. have been suggested as a binder resin for the surface layer of a photoreceptor (see JP-A-60-172044, JP-A-62-247374, JP-A-63-148263, and JP-A-2-254464; the term "JP-A" as used herein means an "unexamined published Japanese patent application").

Use of these known binder resins somewhat achieved improvement on durability, but the state-of-the-art photoreceptors are still unsatisfactory. That is, the coating film comprising the known binder resins does not always have sufficient mechanical strength and, when repeatedly used in a copying machine for a long time, it reduces its thickness due to abrasion and thereby reduces its sensitivity. It follows that fog develops or the charging potential decreases to reduce the image density. Further, the scratch made on the surface of a photosensitive layer or a foreign substance adhered thereto due to toner filming, etc. causes image defects.

Where a photosensitive layer has a charge transporting layer comprising a charge transporting material and a binder resin, compatibility between the binder resin and the charge transporting material is of importance. If the compatibility is poor, it is known that the charge transporting material crystallizes to give serious influences on electric characteristics and image characteristics. Therefore, binder resins to be used in a charge transporting layer must have excellent compatibility to a charge transporting material used in combination.

SUMMARY OF THE INVENTION

An object of the present invention is to provide an electrophotographic photoreceptor which retains sufficient film strength enough to ensure high abrasion resistance and is freed from adhesion of foreign substances due to toner filming, etc. and accordingly exhibits excellent electric and image characteristics.

The present invention provides an electrophotographic photoreceptor comprising a conductive substrate having formed thereon at least a photosensitive layer, wherein said photosensitive layer contains, as binder resins, (A) a polycarbonate resin comprising a recurring unit represented by formula (I):

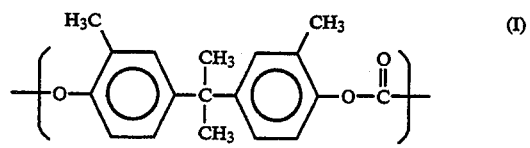

and (B) a polycarbonate resin comprising a recurring unit represented by formula (II) or (III):

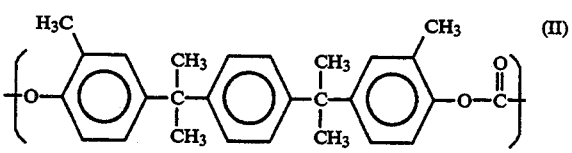

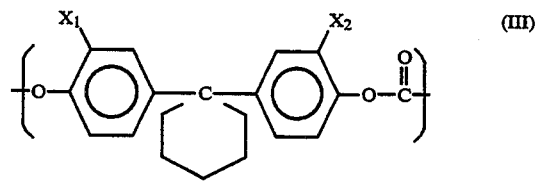

wherein $X_1$ and $X_2$ each represent a hydrogen atom or an alkyl group, or (B') a copolycarbonate resin comprising a recurring unit represented by formula (II) and a recurring unit represented by formula (IV):

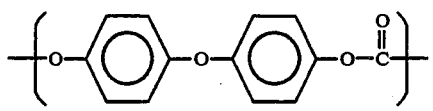 (IV)

said polycarbonate resin (B) or copolycarbonate resin (B') having a lower molecular weight than that of said polycarbonate resin (A).

The copolycarbonate resin comprising the recurring units (II) and (IV) is more flexible than homo-polycarbonate resins and therefore especially suitable as a binder resin for belt photoreceptors requiring flexibility.

DETAILED DESCRIPTION OF THE INVENTION

The electrophotographic photoreceptor according to the present invention comprises a conductive substrate having thereon at least a photosensitive layer.

The conductive substrate which can be used in the present invention includes metals, e.g., aluminum, nickel, chromium, stainless steel, etc.; plastic films having a conductive thin film of aluminum, titanium, nickel, chromium, stainless steel, gold, vanadium, tin oxide, indium oxide or indium-tin oxide (ITO); and paper or plastic films coated or impregnated with a conductivity-imparting material. While not limiting, these conductive substrate materials are usually used in a drum form, a sheet form or a plate form. If desired, the conductive substrate may be subjected to various surface treatments as far as image quality is not impaired. Suitable surface treatments include oxidation, chemical treatments, coloring, and treatments for irregular reflection, such as surface graining.

If desired, a subbing layer may be provided on the conductive substrate. A subbing layer functions to block injection of charge from a conductive substrate to a photosensitive layer at the time of charging and also serves as an adhesive layer between a conductive substrate and a photosensitive layer. In some cases, a subbing layer functions to prevent reflection of light on a conductive substrate.

A subbing layer can be formed by using known binder resins. Examples of suitable binder resins as a subbing layer include polyethylene resins, polypropylene resins, acrylic resins, methacrylic resins, polyamide resins, vinyl chloride resins, vinyl acetate resins, phenolic resins, polycarbonate resins, polyurethane resins, polyimide resins, vinylidene chloride resins, polyvinyl acetal resins, vinyl chloride-vinyl acetate copolymer resins, polyvinyl alcohol resins, water-soluble polyester resins, nitrocellulose, casein, gelatin, polyglutamic acid, starch, starch acetate, amino starch, polyacrylic acid, polyacrylamide, zirconium chelate compounds, titanyl chelate compounds, titanium alkoxides, organotitanium compounds, and silane coupling agents.

In forming a subbing layer, a coating composition containing the above-mentioned binder resin is coated on a conductive substrate by a generally employed coating technique, such as blade coating, wire bar coating, spray coating, dip coating, bead coating, air knife coating, and curtain coating.

A subbing layer usually has a thickness of from 0.01 to 10 μm, and preferably from 0.05 to 2 μm.

A photosensitive layer formed on a conductive substrate may have either a single layer structure or a separate function type laminate structure composed of a charge generating layer and a charge transporting layer. In the latter case, the order of the charge generating layer and the charge transporting layer is not limited.

In the case of a single layer structure, a photosensitive layer comprises a charge generating material, a charge transporting material, and a binder resin. In the case of a laminate structure, the charge generating layer comprises a charge generating material and a binder resin, and the charge transporting layer comprises a charge transporting material and a binder resin.

The charge generating materials which can be used in a photosensitive layer, whether single-layered or laminate-layered, include inorganic photoconductive materials, e.g., amorphous selenium, crystalline selenium-tellurium alloys, selenium-arsenic alloys, other selenium compounds and alloys, zinc oxide, and titanium oxide; and organic pigments or dyes, e.g., phthalocyanine pigments, squarylium pigments, anthanthrone pigments, perylene pigments, azo pigments or dyes, anthraquinone dyes, pyrene compounds, pyrylium salts, and thiapyrylium salts.

Suitable charge transporting materials which can be used in the present invention include oxadiazole derivatives, e.g., 2,5-bis(p-diethylaminophenyl)-1,3,4-oxadiazole; pyrazoline derivatives, e.g., 1,3,5-triphenylpyrazoline and 1-[pyridyl-(2)]-3-(p-diethylaminostyryl)-5-(p-diethylaminophenyl)pyrazoline; aromatic tertiary amino compounds, e.g., triphenylamine and dibenzylaniline; aromatic tertiary diamino compounds, e.g., N,N'-diphenyl-N,N'-bis(3-methylphenyl)-[1,1-biphenyl]-4,4'-diamine; 1,2,4-triazine derivatives, e.g., 3-(4'-dimethylaminophenyl)-5,6-di(4'-methoxyphenyl)-1,2,4-triazine; hydrazone derivatives, e.g., 4-diethylaminobenzaldehyde-1,1-diphenylhydrazone; quinazoline derivatives, e.g., 2-phenyl-4-styrylquinazoline; benzofuran derivatives, e.g., 6-hydroxy-2,3-di(p-methoxyphenyl)benzofuran; α-stilbene derivatives, e.g., p-(2,2-diphenylvinyl)-N,N-diphenylaniline; enamine derivatives described in Journal of Imaging Science, Vol. 29, pp. 7–10 (1985); carbazole derivatives, e.g., N-ethylcarbazole; poly-N-vinylcarbazole and derivatives thereof; poly-γ-carbazolylethyl glutamate and derivatives thereof; and other known charge transporting materials, e.g., pyrene, polyvinylpyrene, polyvinylanthracene, polyvinylacridine, poly-9-biphenylanthracene, pyreneformaldehyde resins, and ethylcarbazoleformaldehyde resins. These charge transporting materials may be used either individually or in combination of two or more thereof.

In the present invention, two kinds of polycarbonate resins (A) and (B) or (B') are used as binder resins of the photosensitive layer; wherein (A) is a polycarbonate resin comprising a recurring unit represented by formula (I), (B) is a polycarbonate resin comprising a recurring unit represented by formula (II) or (III), and (B') is a copolycarbonate resin comprising a recurring unit represented by formula (II) and a recurring unit represented by formula (IV).

In the recurring unit represented by formula (III), $X_1$ and $X_2$ each represent a hydrogen atom or an alkyl group preferably having from 1 to 3 carbon atoms.

Polycarbonate resin (B) comprising a recurring unit of formula (III) includes a modified polycarbonate resin having a recurring unit represented by formula (III-a) or (III-b):

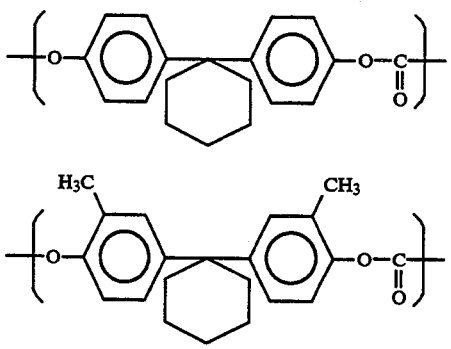

In the case where a photosensitive layer has a laminate structure, the above-mentioned polycarbonate resins may be used in either of a charge generating layer and a charge transporting layer. It is particularly preferred to use them as binder resins of a charge transporting layer.

Polycarbonate resin (A) having a recurring unit of formula (I) has a viscosity-average molecular weight of from 30,000 to 90,000, preferably from 40,000 to 80,000 and more preferably from 50,000 to 70,000. Polycarbonate resin (B) having a recurring unit of formula (II) or (III) or copolycarbonate resin (B') having a recurring unit of formula (II) and a recurring unit of formula (III) has a viscosity-average molecular weight of from 20,000 to 50,000, preferably from 30,000 to 50,000. It is necessary that polycarbonate resin (A) should have a higher molecular weight than that of polycarbonate resin (B) or (B'). Otherwise, the surface of a photosensitive layer will suffer from fine abrasion scratches during long-term use, which cause toner filming.

It is preferred that the viscosity-average molecular weight of polycarbonate resin (A) is at least 10,000, particularly at least 20,000 higher than that of polycarbonate resin (B) or (B').

The polycarbonate resins which can be used in the present invention are produced according to the known methods. For example, that having a recurring unit represented by formula (I) is produced by the method described in U.S. Pat. No. 4,956,256, that having a recurring unit represented by formula (II) is produced by the method described in JP-A-2-254459, and that having a recurring unit represented by formula (III) is produced by the method described in U.S. Pat. No. Re. 33,724.

Generally, into the bisphenol compounds corresponding to the recurring units represented by formulae (I), (II), and (III), alkaline aqueous solution or pyridine is mixed as an acid acceptor in the presence of an inactive catalyst such as methylene chloride or 1,2-dichloroethane and then phosgene is introduced into the mixture to complete the reaction. In the reaction, a quaternary ammonium compound as a reaction rate-increasing catalyst and a monovalent phenol as a molecular weight controlling agent may be added, and further a catalyst for controlling the molecular weight may be added after the formation of oligomers.

A compounding ratio of resins (A) to (B) or (B') preferably ranges from 95:5 to 60:40 by weight, preferably from 90:10 to 60:40 by weight. If this ratio exceeds 95:5, the photoreceptor is liable to suffer from toner filming. If it is less than 60:40, abrasion scratches are liable to develop.

A photosensitive layer can be formed by coating a conductive substrate with a coating composition prepared by dissolving or dispersing the above-mentioned charge generating material and/or the charge transporting material and specific binder resins in an appropriate solvent.

The present invention will further be explained below by referring to a preferred embodiment of a laminate type photoreceptor.

A charge generating layer can be formed by coating a coating composition prepared by dissolving or dispersing a charge generating material and specific binder resins in an appropriate solvent and drying.

A suitable mixing ratio of a charge generating material to binder resins is from 10:1 to 1:10 by weight. Suitable organic solvents to be used for formation of a charge generating layer are methanol, ethanol, n-propyl alcohol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, and chloroform. These solvents may be used either individually or in combination of two or more thereof.

Coating of the coating composition for a charge generating layer can be carried out by any of known techniques, such as blade coating, wire bar coating, spray coating, dip coating, bead coating, air knife coating, and curtain coating.

A charge generating layer usually has a thickness of from 0.05 to 40 μm, and preferably from 0.05 to 25 μm.

A charge transporting layer can be formed by coating a coating composition prepared by dissolving a charge transporting material and specific binder resins in an appropriate solvent and drying.

Suitable solvents to be used in the charge transporting layer formation include aromatic hydrocarbons, e.g., benzene, toluene, xylene, and chlorobenzene; ketones, e.g., acetone and 2-butanone; halogenated aliphatic hydrocarbons, e.g., methylene chloride, chloroform, and ethylene chloride; cyclic or acyclic ethers, e.g., tetrahydrofuran, dioxane, ethylene glycol, and diethyl ether; and mixtures thereof. A preferred mixing ratio of the charge transporting material to binder resins is from 10:1 to 1:5 by weight.

The same coating techniques as used for the charge generating layer formation apply to the charge transporting layer.

The charge transporting layer usually has a thickness of from 2 to 100 μm, and preferably from 10 to 40 μm.

For the purpose of protecting a photoreceptor from ozone or oxidizing gases generated in a copying machine or heat and light, antioxidants, photostabilizers, or the like additives may be added to a photosensitive layer.

Examples of usable antioxidants include hindered phenols, hindered amines, p-phenylenediamine, an arylalkane, hydroquinone, spirochroman, spiroindanone, derivatives of these compounds, organic sulfur compounds, and organic phosphorus compounds.

Examples of usable photostabilizers are benzophenone, benzotriazole, dithiocarbamate, tetramethylpiperidine, and derivatives thereof.

For the purpose of improving sensitivity, reducing a residual potential, and reducing fatigue from repeated use, one or more electron accepting substances may be incorporated into a photosensitive layer. Suitable examples of electron accepting substances which can be used in the present invention are succinic anhydride, maleic anhydride, dibromomaleic anhydride, phthalic anhydride, tetrabromophthalic anhydride, tetracyanoethylene, tetracyanoquinodimethane, o-dinitrobenzene, m-dinitrobenzene, chloranil, dinitroanthraquinone, trinitrofluorenone, picric acid, o-nitrobenzoic acid, p-nitrobenzoic acid, and phthalic acid. Preferred of them are fluorenone type compounds, quinone type compounds, and benzene derivatives having an electron attracting substitute, e.g., Cl, CN or $NO_2$.

The present invention will now be illustrated in greater detail with reference to Examples, but it should be understood that the present invention is not construed as being limited thereto. All the parts are by weight unless otherwise indicated.

EXAMPLE 1

A solution consisting of 10 parts of a zirconium compound (Orgatics ZC540 produced by Matsumoto Seiyaku Co., Ltd.), 1 part of a silane compound (A1110 produced by Japan Unicar Co., Ltd.), 40 parts of isopropyl alcohol, and 20 parts of butanol was coated on an aluminum pipe by dip coating and dried at 150° C. for 10 minutes to form a 0.1 $\mu$m thick subbing layer.

One part of x-type metal-free phthalocyanine crystals was mixed with 1 part of a polyvinyl butyral resin (S-Lec BM-S produced by Sekisui Chemical Co., Ltd.) and 100 parts of cyclohexanone, and the mixture was dispersed in a sand mill together with glass beads for 1 hour. The resulting coating composition was coated on the subbing layer by dip coating and dried by heating at 100° C. for 10 minutes to form a charge generating layer having a thickness of 0.25 $\mu$m.

In 50 parts of monochlorobenzene were dissolved 4 parts of N-ethylcarbazole-3-aldehyde diphenylhydrazone, 4 parts of a polycarbonate resin (A) comprising a recurring unit of formula (I) (viscosity-average molecular weight: 62300) and 2 parts of a polycarbonate resin (B) comprising a recurring unit of formula (II) (viscosity-average molecular weight: 41000), and the resulting coating composition was coated on the charge generating layer by dip coating and dried by heating at 135° C. for 1 hour to prepare a three-layered electrophotographic photoreceptor.

The resulting electrophotographic photoreceptor was set in a copying machine using a semiconductor laser as a light source (A-COLOR 630 manufactured by Fuji Xerox Co., Ltd.), and 30,000 copies were taken. The surface conditions (abrasion or scratches) of the surface of the photoreceptor, image quality of the copies (image defects due to toner filming), and electric characteristics of the photoreceptor were evaluated. The results obtained are shown in Table 1 below.

EXAMPLE 2

An electrophotographic photoreceptor was prepared in the same manner as in Example 1, except for changing the viscosity-average molecular weight of polycarbonate resins (A) and (B) to 80000 and 26000, respectively.

The resulting photoreceptor was evaluated in the same manner as in Example 1. The results obtained are shown in Table 1.

EXAMPLE 3

An electrophotographic photoreceptor was prepared in the same manner as in Example 1, except for changing the resin (A) to resin (B) ratio to 3:3 by weight.

The resulting photoreceptor was evaluated in the same manner as in Example 1. The results obtained are shown in Table 1.

EXAMPLE 4

An electrophotographic photoreceptor was prepared in the same manner as in Example 1, except for replacing the resin (B) with a copolycarbonate resin (B') comprising recurring units of formulae (II) and (IV) (viscosity-average molecular weight: 35000; (II)/(IV) unit ratio: 6:4).

The resulting photoreceptor was evaluated in the same manner as in Example 1. The results obtained are shown in Table 1.

EXAMPLE 5

An electrophotographic photoreceptor was prepared in the same manner as in Example 4, except for changing the viscosity-average molecular weight of polycarbonate resins (A) and (B') to 80000 and 25000, respectively.

The resulting photoreceptor was evaluated in the same manner as in Example 1. The results obtained are shown in Table 1.

EXAMPLE 6

An electrophotographic photoreceptor was prepared in the same manner as in Example 4, except for changing the resin (A) to resin (B') ratio to 3:3 by weight.

The resulting photoreceptor was evaluated in the same manner as in Example 1. The results obtained are shown in Table 1.

EXAMPLE 7

An electrophotographic photoreceptor was prepared in the same manner as in Example 1, except for replacing the resin (B) as used in Example 1 with a polycarbonate resin (B) comprising a recurring unit of formula (III-a) (viscosity-average molecular weight: 39000).

The resulting photoreceptor was evaluated in the same manner as in Example 1. The results obtained are shown in Table 1.

EXAMPLE 8

An electrophotographic photoreceptor was prepared in the same manner as in Example 7, except for replacing the resin (B) as used in Example 7 with a polycarbonate resin (B) comprising a recurring unit of formula (III-b) (viscosity-average molecular weight: 35000).

The resulting photoreceptor was evaluated in the same manner as in Example 1. The results obtained are shown in Table 1.

EXAMPLE 9

An electrophotographic photoreceptor was prepared in the same manner as in Example 7, except for changing the viscosity-average molecular weight of resins (A) and (B) to 80000 and 21000, respectively.

The resulting photoreceptor was evaluated in the same manner as in Example 1. The results obtained are shown in Table 1.

EXAMPLE 10

An electrophotographic photoreceptor was prepared in the same manner as in Example 7, except for changing the resin (A) to resin (B) ratio to 3:3 by weight.

The resulting photoreceptor was evaluated in the same manner as in Example 1. The results obtained are shown in Table 1.

COMPARATIVE EXAMPLE 1

An electrophotographic photoreceptor was prepared in the same manner as in Example 1, except for using only resin (A) as a binder resin.

The resulting photoreceptor was evaluated in the same manner as in Example 1. The results obtained are shown in Table 1.

COMPARATIVE EXAMPLE 2

An electrophotographic photoreceptor was prepared in the same manner as in Example 1, except for changing the viscosity-average molecular weight of resin (A) to 30000.

The resulting photoreceptor was evaluated in the same manner as in Example 1. The results obtained are shown in Table 1.

COMPARATIVE EXAMPLE 3

An electrophotographic photoreceptor was prepared in the same manner as in Example 4, except for changing the viscosity-average molecular weight of resin (A) to 30000.

The resulting photoreceptor was evaluated in the same manner as in Example 1. The results obtained are shown in Table 1.

(I) and (B) a polycarbonate resin having a recurring unit of formula (II) or (III) or (B') a copolycarbonate resin having a recurring unit of formula (II) and a recurring unit of formula (IV) as a binder resin exhibits high film strength against abrasion and causes no toner filming or adhesion of any other foreign substances and is therefore excellent in electric characteristics and image characteristics.

While the invention has been described in detail and with reference to specific examples thereof, it will be apparent to one skilled in the art that various changes and modifications can be made therein without departing from the spirit and scope thereof.

What is claimed is:

1. An electrophotographic photoreceptor comprising a conductive substrate having formed thereon at least a photosensitive layer, wherein said photosensitive layer contains as binder resins, (A) a polycarbonate resin comprising a recurring unit represented by formula (I)

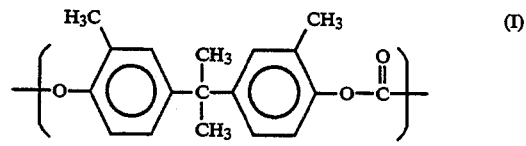

and (B) a polycarbonate resin comprising a recurring unit represented by formula (II) or (III):

TABLE 1

| Example No. | Initial Stage | | | After Taking 30,000 Copies | | |
|---|---|---|---|---|---|---|
| | Dark Potential (V) | Residual Potential (V) | Image Quality | Dark Potential (V) | Residual Potential (V) | Image Quality |
| Example 1 | −700 | −150 | satisfactory | −685 | −170 | satisfactory (no change from the initial stage) |
| Example 2 | −700 | −150 | " | −680 | −165 | satisfactory (no change from the initial stage) |
| Example 3 | −700 | −150 | " | −675 | −170 | slight scratches due to abrasion |
| Example 4 | −700 | −150 | " | −685 | −170 | satisfactory (no change from the initial stage) |
| Example 5 | −700 | −155 | " | −680 | −165 | satisfactory (no change from the initial stage) |
| Example 6 | −700 | −150 | " | −675 | −165 | slight scratches due to abrasion |
| Example 7 | −700 | −150 | satisfactory | −685 | −160 | satisfactory (no change from the initial stage) |
| Example 8 | −700 | −150 | " | −680 | −165 | satisfactory (no change from the initial stage) |
| Example 9 | −700 | −150 | " | −680 | −165 | satisfactory (no change from the initial stage |
| Example 10 | −700 | −150 | " | −675 | −170 | slight scratches due to abrasion |
| Comparative Example 1 | −700 | −175 | " | −670 | −215 | traces of toner filming |
| Comparative Example 2 | −700 | −150 | " | −675 | −165 | fine scratches due to abrasion and traces of toner filming |
| Comparative Example 3 | −700 | −150 | " | −680 | −165 | fine scratches due to abrasion and traces of toner filming |

The electrophotographic photoreceptor according to the present invention using specific combination of (A) a polycarbonate resin having a recurring unit of formula

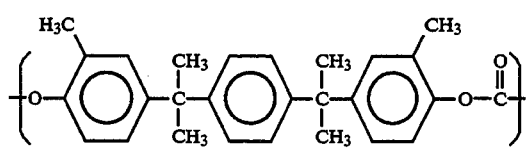

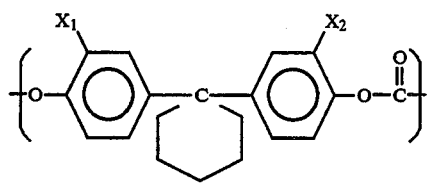

wherein $X_1$ and $X_2$ each represents a hydrogen atom or an alkyl group, said polycarbonate resin (B) having a lower molecular weight than that of said polycarbonate resin (A) and wherein the ratio of polycarbonate resins (A) to (B) is from 95:5 to 60:40.

2. The electrophotographic photoreceptor as claimed in claim 1, wherein said polycarbonate resins (A) and (B) are present at a weight mixing ratio of from 95:5 to 60:40.

3. The electrophotographic photoreceptor as claimed in claim 1, wherein said polycarbonate resin (A) has a viscosity-average molecular weight of from 30,000 to 90,000 and said polycarbonate resin (B) has a viscosity-average molecular weight of from 20,000 to 50,000.

4. An electrophotographic photoreceptor comprising a conductive substrate having formed thereon at least a photosensitive layer, wherein said photosensitive layer contains as binder resins, (A) a polycarbonate resin comprising a recurring unit represented by formula (I):

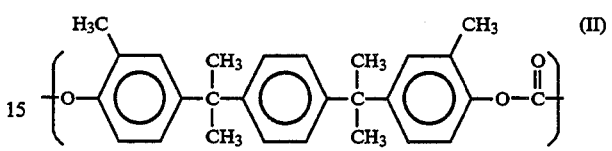

and (B') a polycarbonate resin comprising a recurring unit represented by formula (II):

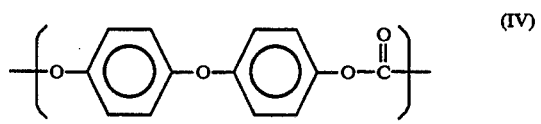

and a recurring unit represented by formula (IV):

said polycarbonate resin (B') having a lower molecular weight than that of said polycarbonate resin (A) and wherein the ratio of polycarbonate resins (A) to (B') is from 95:5 to 60:40. pg,28

5. The electrophotographic photoreceptor as claimed in claim 4, wherein said polycarbonate resins (A) and (B') are present at a weight mixing ratio of from 95:5 to 60:40.

6. The electrophotographic photoreceptor as claimed in claim 4, wherein said polycarbonate resin (A) has a viscosity-average molecular weight of from 30,000 to 90,000 and said polycarbonate resin (B') has a viscosity-average molecular weight of from 20,000 to 50,000.

* * * * *